US012731896B2

(12) United States Patent
Liu et al.

(10) Patent No.: US 12,731,896 B2
(45) Date of Patent: Sep. 8, 2026

(54) ANTENNA STRUCTURE

(71) Applicant: Qisda Corporation, Taoyuan City (TW)

(72) Inventors: An-Chun Liu, Taoyuan City (TW); Chih-Hsuan Wang, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 145 days.

(21) Appl. No.: 18/800,221

(22) Filed: Aug. 12, 2024

(65) Prior Publication Data

US 2025/0079706 A1 Mar. 6, 2025

(30) Foreign Application Priority Data

Sep. 4, 2023 (CN) ......................... 202311130845.3

(51) Int. Cl.
*H01Q 5/30* (2015.01)
*H01Q 1/52* (2006.01)

(52) U.S. Cl.
CPC ............... *H01Q 5/30* (2015.01); *H01Q 1/526* (2013.01)

(58) Field of Classification Search
CPC ............ H01Q 5/30; H01Q 1/526; H01Q 5/50; H01Q 13/106; H01Q 13/103; H01Q 5/10; H01Q 1/241; H01Q 5/20
See application file for complete search history.

(56) References Cited

U.S. PATENT DOCUMENTS

| | | | | | |
|---|---|---|---|---|---|
| 5,592,185 | A * | 1/1997 | Itabashi | H01Q 9/28 343/768 |
| 6,384,794 | B1 * | 5/2002 | Huang | H01Q 13/103 343/768 |
| 10,511,079 | B2 * | 12/2019 | Wu | H01Q 1/2266 |
| 2018/0342809 | A1 * | 11/2018 | Wu | G06F 1/16 |
| 2019/0044232 | A1 * | 2/2019 | Tseng | H01Q 1/245 |
| 2019/0089047 | A1 * | 3/2019 | Hara | H01Q 13/10 |
| 2020/0168991 | A1 * | 5/2020 | Chang | H01Q 1/38 |
| 2024/0113425 | A1 * | 4/2024 | Theofanopoulos | H01Q 1/48 |
| 2024/0313378 | A1 * | 9/2024 | Grävendieck | H01P 5/16 |
| 2025/0079706 | A1 * | 3/2025 | Liu | H01Q 5/50 |
| 2025/0125516 | A1 * | 4/2025 | Yao | H01Q 21/06 |
| 2025/0316903 | A1 * | 10/2025 | Amjadi | H01Q 1/22 |

FOREIGN PATENT DOCUMENTS

| | | | | |
|---|---|---|---|---|
| CN | 101752675 B | | 5/2013 | |
| CN | 105896087 B | | 8/2016 | |
| CN | 107230834 A | * | 10/2017 | H01Q 1/50 |
| CN | 208622944 U | * | 3/2019 | |
| CN | 112599982 A | | 4/2021 | |
| CN | 213483937 U | * | 6/2021 | |

* cited by examiner

*Primary Examiner* — Dameon E Levi
*Assistant Examiner* — Jordan E. DeWitt

(57) ABSTRACT

An antenna structure is provided. The antenna structure includes a conductor substrate, a coupling feed-in element and a shielding element. The conductor substrate has a slot. The coupling feed-in element, partly overlapping the slot, is disposed on the conductor substrate. The shielding element, partly overlapping the slot, is separated from the coupling feed-in element and disposed on the conductor substrate, wherein the shielding element is movable along the slot.

14 Claims, 7 Drawing Sheets

ANTENNA STRUCTURE

This application claims the benefit of People's Republic of China patent application Serial No. 202311130845.8, filed Sep. 4, 2023, the subject matter of which is incorporated herein by reference.

BACKGROUND OF THE INVENTION

Field of the Invention

The invention relates in general to an antenna structure, and more particularly to an antenna structure capable of achieving frequency shift according to actual needs.

Description of the Related Art

Antenna is an essential of a wireless communication product. The performance and characteristics of an antenna are crucial to communication quality. Nowadays, wireless communication products place more and more emphasis on the practicality and technology sides, and the design of antenna structure is getting more and more versatile. In the application of antenna structure, the operating frequency band is highly associated with the design of antenna structure. However, once the design of antenna structure is determined, there is no way to adjust the operating frequency band in response to the needs.

SUMMARY OF THE INVENTION

The invention is directed to an antenna structure capable of achieving frequency shift through a shielding element, which is movable along the slot.

According to one embodiment of the present invention, an antenna structure is provided. The antenna structure includes a conductor substrate, a coupling feed-in element and a shielding element. The conductor substrate has a slot. The coupling feed-in element, partly overlapping the slot, is disposed on the conductor substrate. The shielding element, partly overlapping the slot, is separated from the coupling feed-in element and disposed on the conductor substrate, and the shielding element is movable along the slot.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of each embodiment of the present invention are disclosed below with reference to accompanying drawings. Apart from the said detailed descriptions, any embodiments in which the present invention may be used as well as any substitutions, modifications or equivalent changes of the said embodiments are within the scope of the present invention, and the descriptions and definitions in the claims shall prevail. Many specific details and embodiments are disclosed in the specification for anyone ordinary skilled in the art to comprehensively understand the present invention, not for limiting the present invention. Moreover, generally known procedures or elements are not disclosed to avoid adding unnecessary restrictions to the present invention.

Figure 1A:
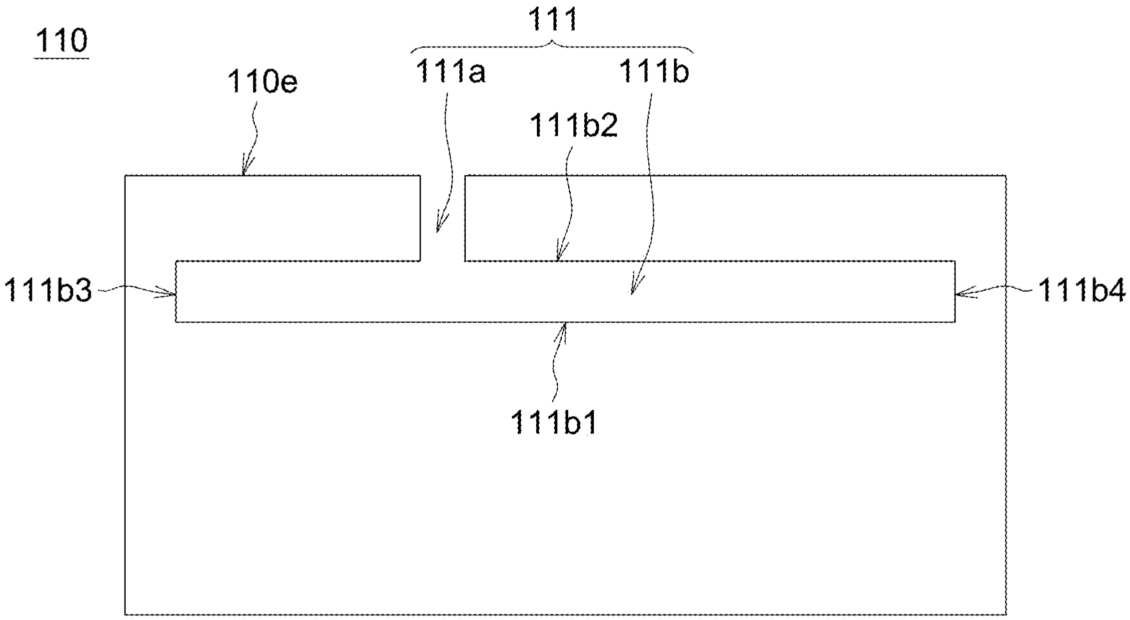
FIG. 1A is a schematic diagram of a conductor substrate according to an embodiment of the invention.

The invention provides an antenna structure applicable to any wireless communication products wireless communication products. The antenna structure disclosed in the embodiment may be realized by a slot antenna. The slot antenna is manufactured on a conductor substrate, so that space usage may be reduced in response to the requirements of thinness and lightweight in the design of wireless communication products. As indicated in FIG. 1A, a schematic diagram of a conductor substrate 110 according to an embodiment of the invention is shown. The conductor substrate 110 may be made of metal and may have a slot 111. In the embodiment indicated in FIG. 1A, the slot 111 is a T-shaped slot, but the invention is not limited thereto. The slot 111 may have an open portion 111*a* and a closed portion 111*b* interconnected with each other. The open portion 111*a* forms an opening on an edge 110*e* of the conductor substrate 110. The closed portion 111*b* has two long sides 111*b*1 and 111*b*2 disposed oppositely, and two short sides 111*b*3 and 111*b*4 disposed oppositely. The short sides 111*b*3 and 111*b*4 are respectively adjacent to the two long sides 111*b*1 and 111*b*2. The long side 111*b*2 is connected to the open portion 111*a*.

Figure 1B:
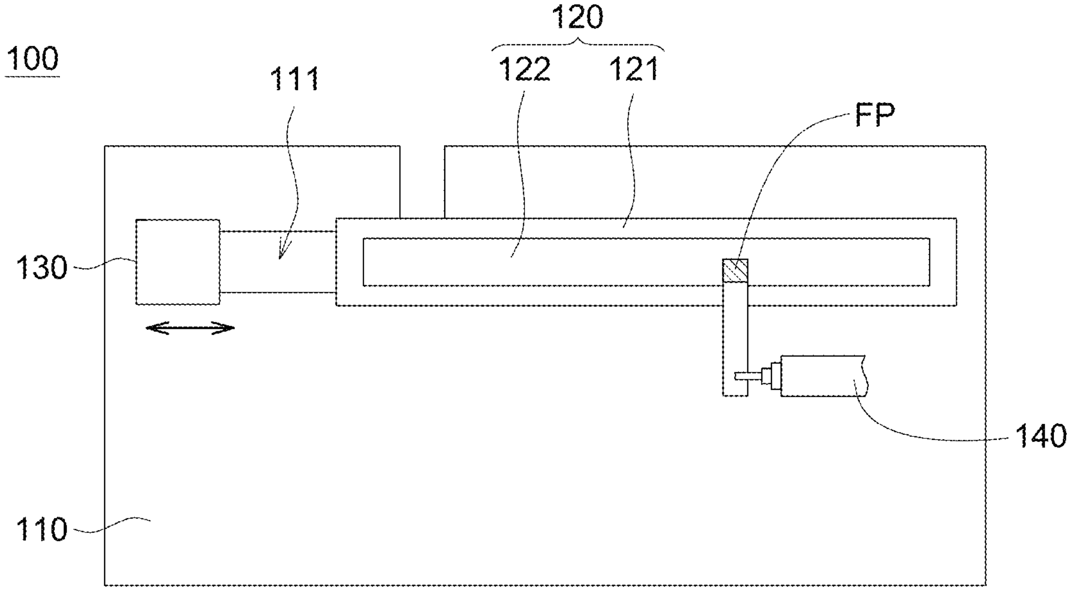
FIG. 1B is a schematic diagram of an antenna structure according to an embodiment of the invention.
Figure 1C:
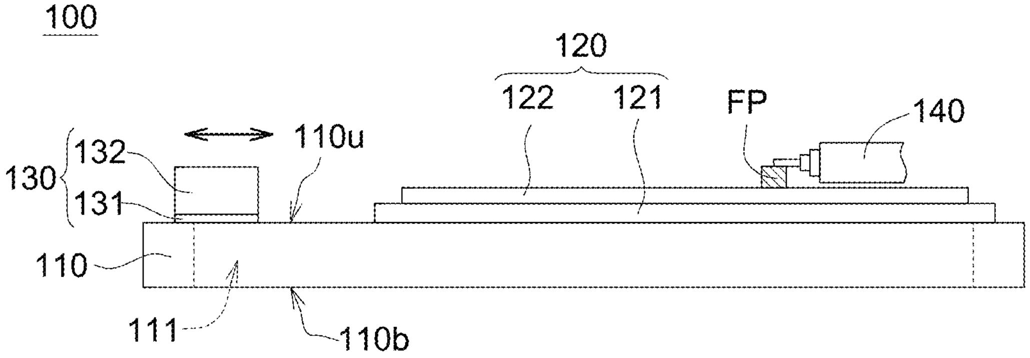
FIG. 1C is a side view of the antenna structure of FIG. 1B.

FIG. 1B is a schematic diagram of an antenna structure 100 according to an embodiment of the invention. FIG. 1C is a side view of the antenna structure 100 of FIG. 1B. The antenna structure 100 is manufactured on the conductor substrate 110 of FIG. 1A. Refer to FIG. 1A, FIG. 1B and FIG. 1C. The antenna structure 100 further includes a coupling feed-in element 120 and a shielding element 130. The coupling feed-in element 120, partly overlapping the slot 111, is disposed on the conductor substrate 110.

The coupling feed-in element 120 has a feed-in portion FP connected to a signal source (such as a coaxial cable 140). Signals are fed to the coupling feed-in element 120 through the feed-in portion FP. When signals are fed to the coupling feed-in element 120, the coupling feed-in element 120 and the slot 11 enable the antenna structure 100 to resonate with the first frequency band.

In an embodiment, the coupling feed-in element 120 may be realized by an antenna module. The coupling feed-in element 120 may include a carrier plate 121 and an antenna portion 122. The carrier plate 121 is disposed on the first side 110*u* of the conductor substrate 110 and may be realized by such as an FR4 substrate, a printed circuit board (PCB), or a flexible circuit board (FCB). The selection of the carrier plate 121 depends on actual needs and is not subjected to specific restrictions. The antenna portion 122, which may be realized by a conductive structure, is formed on the carrier plate 121. For instance, the antenna portion 122 is a conductive sheet structure formed on the carrier plate 121. In the present embodiment, the antenna portion 122 has a rectangular shape, but the invention is not limited thereto. The shape of the antenna portion 122 depends on actual needs. The feed-in portion FP is disposed on the antenna portion 122. When signals are fed to the antenna portion 122, the antenna portion 122 interacts with the slot 11, so that the antenna structure 100 may resonate with the first frequency band. Besides, the antenna structure 100 may further resonate with a second frequency band. The second frequency band may include an operating frequency band of the antenna module and/or a multiple of the first frequency band.

If the first frequency band is the main resonance frequency band of the antenna structure 100, ideal frequency may be obtained through frequency shift by moving the shielding element 130. Refer to FIG. 1A, FIG. 1B and FIG. 1C. The shielding element 130, partly overlapping the slot 111, is separated from the coupling feed-in element 120 and disposed on the conductor substrate 110. As indicated by the arrows of FIG. 1B and FIG. 1C, the shielding element 130 may move along the slot 111 so as to change the first frequency band. The shielding element 130 may move relative to the slot 111 by means of any sliding mechanism. For instance, a chute and a slider may be disposed between the shielding element 130 and the conductor substrate 110, so that the shielding element 130 may move along the slot 111. In an embodiment, the shielding element 130 may be made of a conductive material, but the invention is not limited thereto. In an embodiment as indicated in FIG. 1C, the shielding element 130 may include a conductive portion 131 and a non-conductive portion 132, wherein the conductive portion 131 is disposed between the conductor substrate 110 and the non-conductive portion 132. The shielding element 130 may be slidably disposed on the conductor substrate 110 and may be positioned at any position of the slot 111 so as to achieve frequency shift of the first frequency band.

Figure 1D:
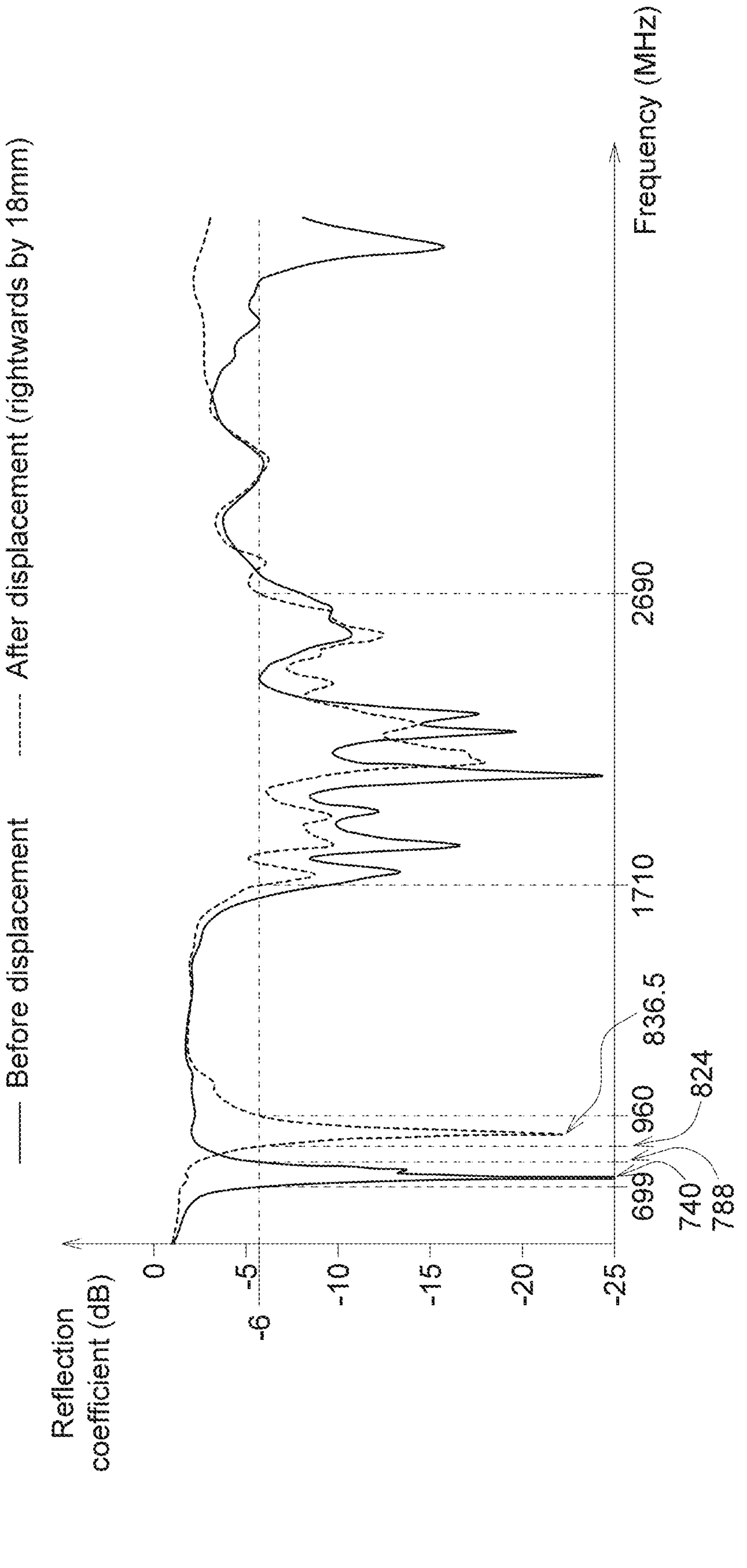
FIG. 1D illustrates a result of frequency shift of the antenna structure of FIG. 1B.
Figure 1E:
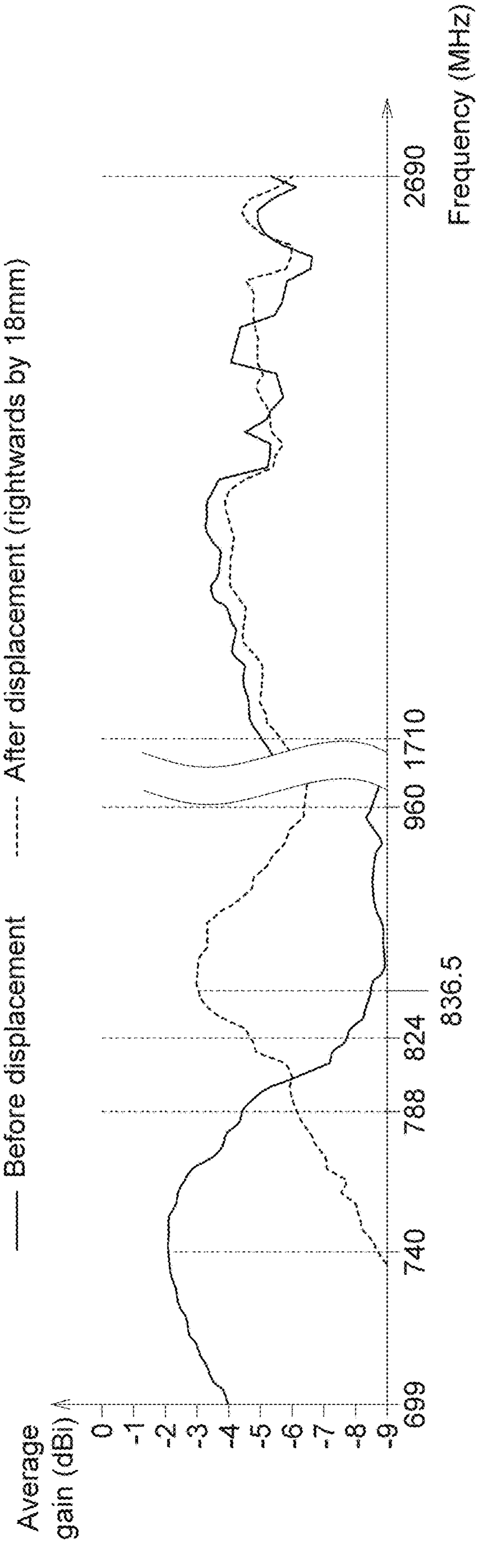
FIG. 1E illustrates an antenna gain of the antenna structure of FIG. 1B before and after frequency shift is performed.

FIG. 1D illustrates a result of frequency shift of the antenna structure 100 of FIG. 1B. FIG. 1E illustrates an antenna gain of the antenna structure 100 of FIG. 1B before and after frequency shift is performed. Refer to FIG. 1B, FIG. 1D and FIG. 1E In an embodiment, before the shielding element 130 is displaced, a highest radiation efficiency may be generated at the resonance frequency of 740 MHz within the first frequency band between 699-788 MHz. When the shielding element 130 is displaced rightward by such as 18 mm, the first frequency band changes to be between 824-960 Hz, within which the highest radiation efficiency may be generated at the resonance frequency of 836.5 MHz. As the shielding element 130 is displaced rightwards and becomes closer to the coupling feed-in element 120, the resonance frequency shifts towards a higher frequency so that frequency shift may be achieved. Relatively, the displacement of the shielding element 130 does not affect the second frequency band (1710-2690 MHz) much.

In above embodiment, the coupling feed-in element 120 is located at one end of the slot 111, and the shielding element 130 is disposed opposite to the coupling feed-in element 120. Refer to FIG. 1A and FIG. 1B. The coupling feed-in element 120 and the shielding element 130 overlap the closed portion 111*b* of the slot 111. The coupling feed-in element 120 is disposed at one end of the closed portion 111*b* closer to the short side 111*b*4. The shielding element 130 is disposed at one end of the closed portion 111*b* closer to the short side 111*b*3 and may move along the long sides 111*b*1 and 111*b*2 of the closed portion 111*b*. However, the invention is not limited thereto. Relative disposition between the coupling feed-in element 120, the shielding element 130 and the slot 111 may be determined according to actual needs. For instance, the coupling feed-in element 120 and/or the shielding element 130 may overlap the open portion 111*a* of the slot 111; or the coupling feed-in element 120 and the shielding element 130 are not disposed at two opposite ends of the closed portion 111*b*.

Figure 2A:
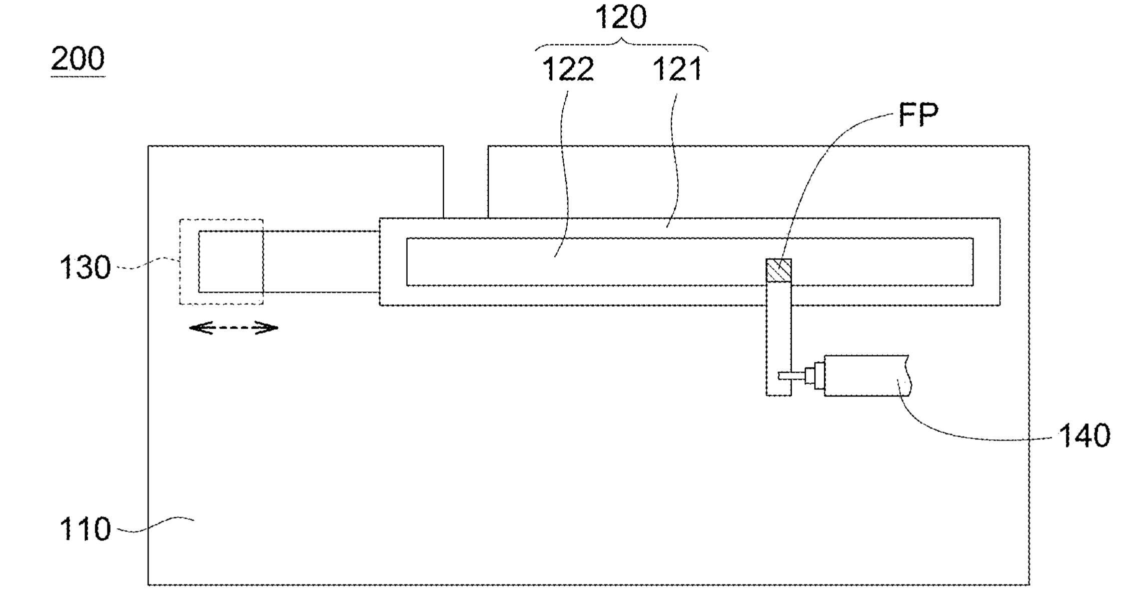
FIG. 2A is a schematic diagram of an antenna structure according to the deformation in an embodiment of the invention.
Figure 2B:
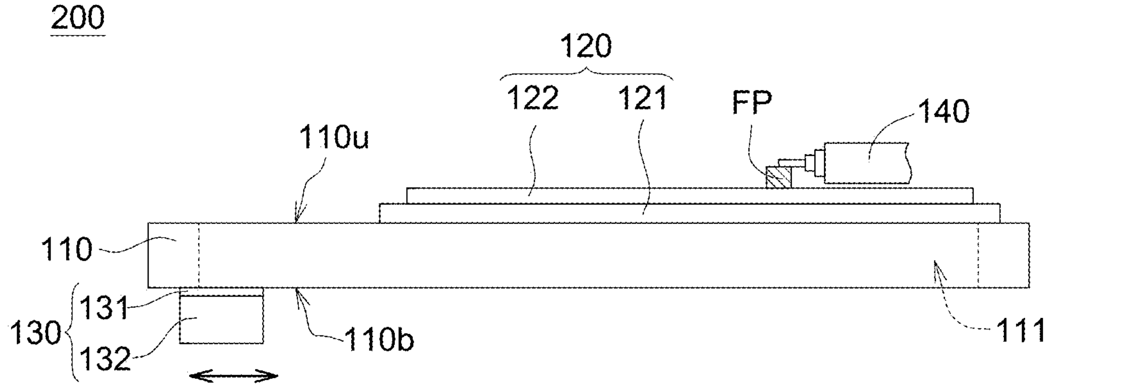
FIG. 2B is a side view of the antenna structure of FIG. 2A.

FIG. 2A is a schematic diagram of an antenna structure 200 according to the deformation in an embodiment of the invention. FIG. 2B is a side view of the antenna structure 200 of FIG. 2A. In the embodiments indicated in FIG. 1A FIG. 1C, the coupling feed-in element 120 and the shielding element 130 are located on the same side of the conductor substrate 110, such as the first side 110*u* of the conductor substrate 110. In the embodiments indicated in FIG. 2A and FIG. 2B, the coupling feed-in element 120 and the shielding element 130 may be disposed on different sides of the conductor substrate 110. For instance, the coupling feed-in element 120 is located on the first side 110*u* of the conductor substrate 110, and the shielding element 130 is located on the second side 110*b* of the conductor substrate 110, wherein the first side 110*u* and the second side 110*b* are disposed oppositely.

Figure 3:
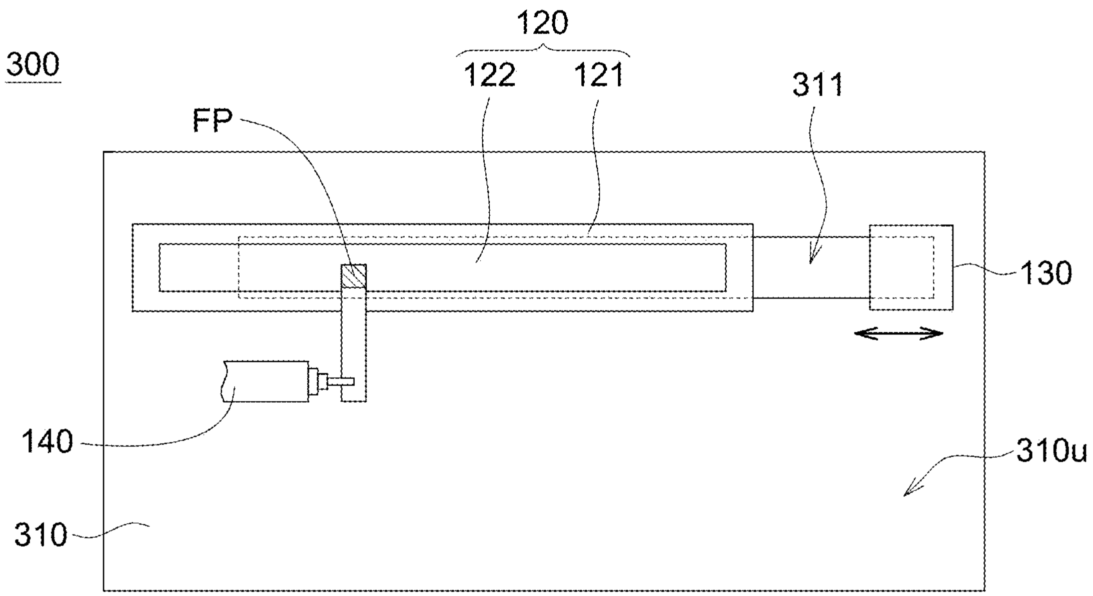
FIG. 3 is a schematic diagram of an antenna structure according to another embodiment of the invention.

Referring to FIG. 3, a schematic diagram of an antenna structure 300 according to another embodiment of the invention is shown. The coupling feed-in element 120 and the shielding element 130 is located on the same side of the conductor substrate 310, such as the first side 310*u* of the conductor substrate 310. In the embodiment indicated in FIG. 3, the slot 311 is an I-shaped slot. The coupling feed-in element 120 and the shielding element 130 are respectively disposed at two opposite ends of the slot 311. Similarly, the shielding element 130 may move along the slot 311 to achieve frequency shift of the first frequency band.

Figure 4:
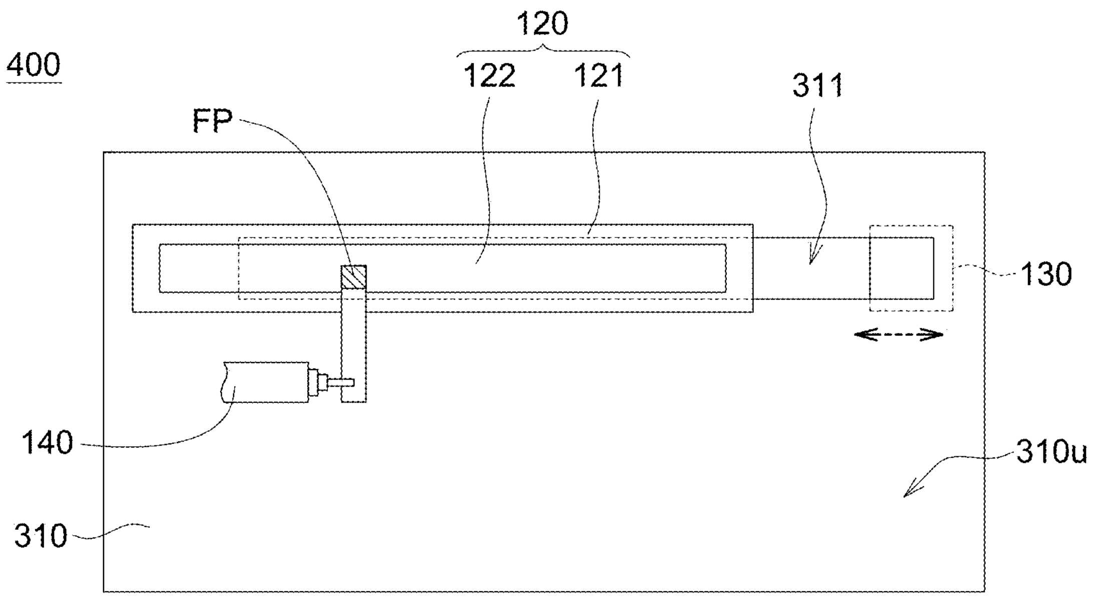
FIG. 4 is a schematic diagram of an antenna structure according to the deformation in another embodiment of the invention.

Referring to FIG. 4, a schematic diagram of an antenna structure 400 according to the deformation in another embodiment of the invention is shown. In the embodiment indicated in FIG. 4, the coupling feed-in element 120 and the shielding element 130 may be disposed on different sides of the conductor substrate 310. For instance, the coupling feed-in element 120 is located on the first side 310*u* of the conductor substrate 110, and the shielding element 130 is located on the second side of the conductor substrate 310 (not illustrated), wherein the first side 310*u* and the second side are disposed oppositely.

Figure 5:
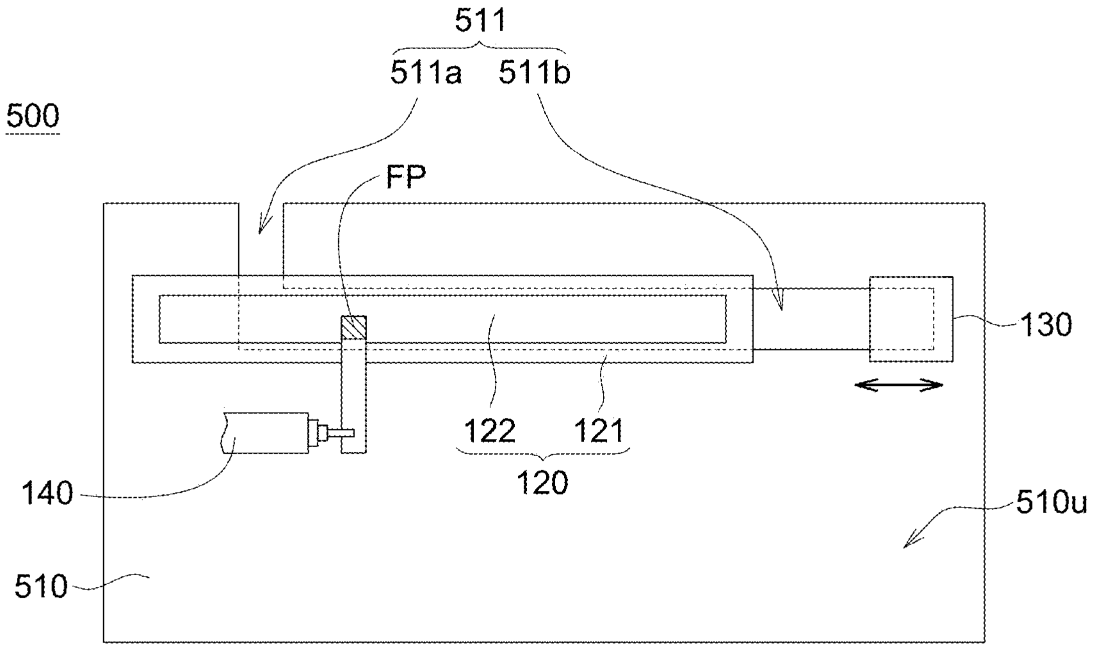
FIG. 5 is a schematic diagram of an antenna structure according to an alternate embodiment of the invention.

Referring to FIG. 5, a schematic diagram of an antenna structure 500 according to an alternate embodiment of the invention is shown. The coupling feed-in element 120 and the shielding element 130 is located on the same side of the conductor substrate 510, such as the first side 510*u* of the conductor substrate 510. In the embodiment indicated in FIG. 5, the slot 511 is an L-shaped slot. The slot 511 may have an open portion 511*a* and a closed portion 511*b* interconnected with each other. The coupling feed-in element 120 and the shielding element 130 are respectively disposed at two opposite ends of the closed portion 511*b*, and the shielding element 130 may move along the long side of the closed portion 511*b* to achieve frequency shift of the first frequency band.

Figure 6:
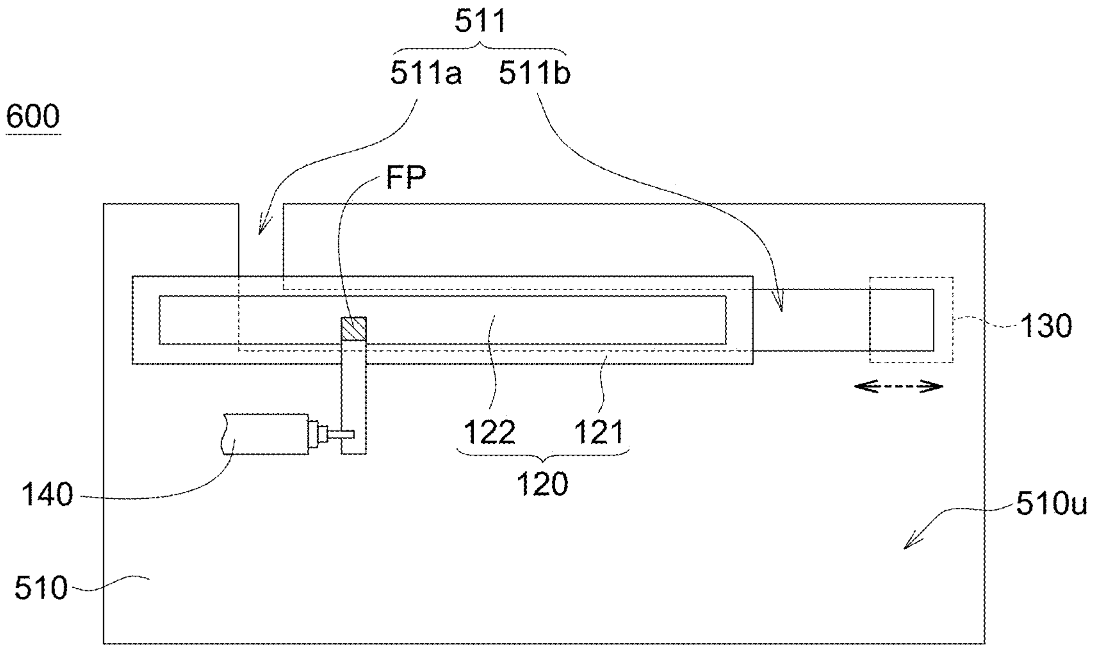
FIG. 6 is a schematic diagram of an antenna structure according to the deformation in an alternate embodiment of the invention.

Referring to FIG. 6, a schematic diagram of an antenna structure 600 according to the deformation in an alternate embodiment of the invention is shown. In the embodiment indicated in FIG. 6, the coupling feed-in element 120 and the shielding element 130 may be disposed on different sides of the conductor substrate 510. For instance, the coupling feed-in element 120 is located on the first side 510*u* of the conductor substrate 510, and the shielding element 130 is located on the second side of the conductor substrate 510 (not illustrated), wherein the first side 510*u* and the second side are disposed oppositely.

According to the antenna structure disclosed above, through the design of slot shape as well as relative disposition between the coupling feed-in element, the shielding element and the slot, resonance frequency required by the antenna structure may be obtained according to actual needs. Moreover, the shielding element may move relative to the slot to achieve frequency shift. Thus, operating frequency band may be suitably adjusted in response to the needs of wireless communication products.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An antenna structure comprising:

a conductor substrate having a slot;

a coupling feed-in element, wherein the coupling feed-in element, partly overlapping the slot, is disposed on the conductor substrate; and a shielding element comprising a conductive portion and a non-conductive portion, wherein the conductive portion is disposed between the conductor substrate and the non-conductive portion, and the shielding element, partly overlapping the slot, is separated from the coupling feed-in element and disposed on the conductor substrate, and the shielding element is movable along the slot.

2. The antenna structure according to claim 1, wherein the coupling feed-in element and the slot enable the antenna structure to resonate with a first frequency band.

3. The antenna structure according to claim 2, wherein the shielding element is movable along the slot to change the first frequency band.

4. The antenna structure according to claim 2, wherein the coupling feed-in element is an antenna module.

5. The antenna structure according to claim 4, wherein the antenna structure resonates with a second frequency band, and the second frequency band comprises an operating frequency band of the antenna module and/or a multiple of the first frequency band.

6. The antenna structure according to claim 1, wherein the shielding element is made of a conductive material.

7. The antenna structure according to claim 1, wherein the shielding element is slidably disposed on the conductor substrate and positioned at any position of the slot.

8. The antenna structure according to claim 1, wherein the slot is an I-shaped slot, an L-shaped slot or a T-shaped slot.

9. The antenna structure according to claim 1, wherein the coupling feed-in element is located at one end of the slot, and the shielding element is opposite to the coupling feed-in element.

10. The antenna structure according to claim 9, wherein the closer to the coupling feed-in element the shielding element become, the higher a resonance frequency between the coupling feed-in element and the slot is.

11. The antenna structure according to claim 1, wherein the slot has an open portion and a closed portion interconnected with each other, the open portion forms an opening on an edge of the conductor substrate, and the coupling feed-in element and the shielding element overlap the closed portion.

12. The antenna structure according to claim 11, wherein the closed portion has two long sides and two short sides, and the shielding element is movable along the two long sides of the closed portion.

13. The antenna structure according to claim 1, wherein the conductor substrate has a first side and a second side disposed oppositely, and the coupling feed-in element and the shielding element are located on the first side of the conductor substrate.

14. The antenna structure according to claim 1, wherein the conductor substrate has a first side and a second side disposed oppositely, and the coupling feed-in element and the shielding element are respectively located on the first side and the second side of the conductor substrate.

* * * * *